US006556895B2

United States Patent
Ben-Jaacov et al.

(10) Patent No.: US 6,556,895 B2
(45) Date of Patent: Apr. 29, 2003

(54) METHOD FOR TRANSFER ALIGNMENT OF AN INERTIAL MEASUREMENT UNIT IN THE PRESENCE OF UNKNOWN AIRCRAFT MEASUREMENTS DELAYS

(75) Inventors: Joseph Ben-Jaacov, Nesher (IL); Jacob Reiner, Misgav (IL)

(73) Assignee: Rafael-Armament Development Authority Ltd., Haifa (IL)

( * ) Notice: Subject to any disclaimer, the term of this patent is extended or adjusted under 35 U.S.C. 154(b) by 0 days.

(21) Appl. No.: 09/871,679

(22) Filed: Jun. 4, 2001

(65) Prior Publication Data

US 2002/0049519 A1 Apr. 25, 2002

(30) Foreign Application Priority Data

Jun. 5, 2000 (IL) ................................................. 136566

(51) Int. Cl.[7] .............................. F41G 7/28; F41G 7/36; F41G 1/54
(52) U.S. Cl. ...................... 701/3; 701/4; 244/2; 342/62
(58) Field of Search .......................... 701/3, 4; 244/3.1, 244/2, 175, 194, 30, 3.2, 3.4; 342/62, 64, 95

(56) References Cited

U.S. PATENT DOCUMENTS

| | | | | |
|---|---|---|---|---|
| 4,288,049 A | * | 9/1981 | Alpers ....................... 244/3.14 |
| 5,150,856 A | * | 9/1992 | Gaide ......................... 244/3.2 |
| 5,245,909 A | * | 9/1993 | Corrigan et al. ........... 89/41.19 |
| 5,260,709 A | * | 11/1993 | Nowakowski ................ 342/62 |
| 5,470,033 A | * | 11/1995 | Tsai et al. ................. 244/110 E |
| 5,672,872 A | * | 9/1997 | Wu et al. .................... 250/330 |
| 6,094,163 A | * | 7/2000 | Chang ................... 342/357.06 |
| 6,278,945 B1 | * | 8/2001 | Lin ............................. 701/216 |

OTHER PUBLICATIONS

Bar–Itzhak et al "The enigma of false Bias Detection in a Strapdown System During Transfer Alignment" J Guidance, 8, 175 (1985).

Baziw et al "In–Flight Alignment and Calibration of IMU" Part I and II, IEEE Transactions on Aerospace and Electronic Systems vol. AES–5, Jul. 1972, pp 439–465.

* cited by examiner

Primary Examiner—Tan Q. Nguyen
Assistant Examiner—Dalena Tran
(74) Attorney, Agent, or Firm—Mark M. Friedman

(57) ABSTRACT

A method for velocity match transfer alignment between a carrier vehicle and a carried vehicle. The method includes repeatedly measuring a velocity difference between the carrier vehicle and the carried vehicle, updating a state vector that include a predicted value of the velocity difference, propagating the vector forward in time, and moving the carrier vehicle and the carried vehicle along a trajectory.

9 Claims, 2 Drawing Sheets

METHOD FOR TRANSFER ALIGNMENT OF AN INERTIAL MEASUREMENT UNIT IN THE PRESENCE OF UNKNOWN AIRCRAFT MEASUREMENTS DELAYS

FIELD AND BACKGROUND OF THE INVENTION

The present invention relates to in-flight transfer alignment of the inertial navigation system (INS) of a carried vehicle which is launched from a carrier vehicle and, in particularly to the alignment procedure in the presence of unknown delays in the measurements provided by the INS of the carrier vehicle, with respect to the measurements taken by the INS of the carried vehicle.

Airplanes often carry with them other flying vehicles, such as unmanned airplanes or missiles, hereinafter; carried vehicles, which are to be launched during flight.

Once the carried vehicle is launched, it will use its own internal measurement unit (IMU) to provide data to its autonomous INS. In order to do so correctly, the IMU of the carried vehicle has to be calibrated and aligned prior the launch.

The calibration and alignment is performed during flight, while the two vehicles are still attached. In this procedure, called flight transfer alignment, the velocity of the carried vehicle as computed by its INS according to the data supplied by its IMU, is compared to the velocity supplied by the aircraft's INS, which is regarded to be error free and is therefore used as reference.

The difference between these two velocities which is attributed to the misalignment of the carried vehicle with respect to its carrier and to the offset of the gyroscopes and accelerometers of its IMU, is processed by a computerized statistical procedure known as a Kalman filter which yields the misalignment data of the carried vehicle with regard to its carrier as well as the carried IMU drift and bias data.

This procedure, of aligning during flight of the carried vehicle's INS with the carrier's INS by comparing their velocities as supplied by the measurements of their independent IMUs, is known as transfer alignment (TA).

While the estimation of the level misalignment angles (pitch, $\theta$ and roll, $\phi$), illustrated in FIG. 1 to which reference is now made, is accomplished with no difficulties, the azimuth misalignment (yaw angle, p) requires that the carrier vehicle perform alignment maneuvers which enable the Kalman filter TA to achieve observability of the yaw angle, and to separate between tilt errors and accelerometer biases, which otherwise tend to compensate each other.

Generally, flight trajectory during the TA may include four flight segments: The first flight segment is a straight and level flight for the purpose of initial leveling. The second segment whose purpose is the azimuth alignment, consists of a trajectory which is C shaped in parallel to ground. The third segment, for the purpose of final leveling, is again a straight and level flight at the same direction as in the first segment, and the last section, sometimes omitted is used to simulate the navigation of the carried vehicle after the transfer alignment.

It has been shown, however, that the use of the information obtained during the second segment of the transfer alignment flight, which is essential for the estimation of the azimuth misalignment error, introduces a large position error.

The reason for it as explained by Bar-Itzhak and Vitek (I. Y. Bar-Itzhak and Y. Vitek, "*The enigma of false Bias Detection in a Strapdown System During Transfer Alignment*", J. Guidance, 8, 175 (1985)), is a time delay between the data produced by the cartier's INS and the data of the carried vehicle's INS, which occurs because both systems operate with independent clocks which are not synchronized.

It was further shown by Bar-Itzhak and Vitek that this undefined constant time delay, which was introduced into the measurements, resembles a signal, which only a longitudinal accelerometer bias would have made.

Thus, the Kalman filter algorithm whose model is based on a dynamic system which does not model the influence of the time delay, identifies the signature of the time delay in the measured signal as the signature of the longitudinal accelerometer bias. Consequently the Kalman filter produces an excessive estimate of the accelerometer bias.

It is evident that such synchronization errors arise only during the second segment of the transfer alignment flight, where the data changes due the lateral acceleration in the flight maneuver, where as during the straight and level flight (in segments I and III), where the velocity readings of the INSs are constant, (except for white noise), no time delay effects exist.

Because the trajectory of the second segment is required for the yaw-angle observability, and because the synchronization of the data during this segment requires an extra effort, it is desired to have a method for TA, which overcomes the uncertainties which are introduced by the time delay.

SUMMARY OF THE PRESENT INVENTION

We have comprehended the fact that synchronization errors affect TA only when the velocity measurements of the carrier and of the carried vehicle are compared while the aircraft is accelerating (during the second segment of the alignment flight). Furthermore, we are aware of the prior art, which considered flight in the second segment to be essential for a complete TA and required that velocity errors be measured during flight in this segment.

We have discovered, that the important factor about TA is the fact that there exists a lateral acceleration and thus velocity changes between the first and the third segments, and that this information can be handled later, rather then collecting the data during the transition period.

Accordingly, the present invention is a method of TA, which does not compare the velocities during the acceleration of the aircraft.

The validity of our method was analytically proven and confirmed by simulations and actual flight tests.

The present invention includes the definition of a 12 dimensional state vector, which consist of the estimations of the following carried vehicle's error components: velocities (x3), angles (x3), gyroscope drifts (x3) and accelerometer biases (x3).

This vector which is the output of the Kalman filter, whose input is the measured difference between the carrier velocity and the carried vehicle velocity, (the velocity error vector), is continuously updated during the TA flight.

The values of the terms of the state vector prior to the launch provides the pre-launch initial condition for the carried vehicle navigation during its mission; The conditions are: its initial velocities, its initial attitude with respect to the LLLN (Local Level Local North) coordinate system shown in FIG. 1, and its initial instrumental offsets.

The present invention includes a new schedule of the TA flight and a different routine for data processing, which are based on the possibility of separating the state vector entirely into its components, during all stages of the alignment flight.

It is therefore an object of the present invention to provide a method for determining the pre-launch inertial condition for the INS of a carrier based launched vehicle.

It is another object of the present invention to provide a new method of TA.

It is another object of the present invention to provide such a method, which is not subjected to errors, which are caused by time delays in the information supplied by the carrier vehicle.

It is another object of the present invention to provide such a method, in which the alignment maneuvers of the carrier airplane are minimized.

It is another object of the present invention to provide such a method in cost effective manner.

Other objects of the invention will become apparent upon reading the following description taken in conjunction with the accompanying drawings.

It should also be understood that this invention is not limited to aircraft, and that it is applicable to boarding platforms of other kinds including space naval or under water vehicles.

DESCRIPTION OF THE PREFERRED EMBODIMENTS

The preferred embodiments herein are not intended to be exhaustive and to limit in any way the scope of the invention, rather they are used as examples for the clarification of the invention and for the enabling of other skilled in the art to utilize its teaching.

Figure 1:
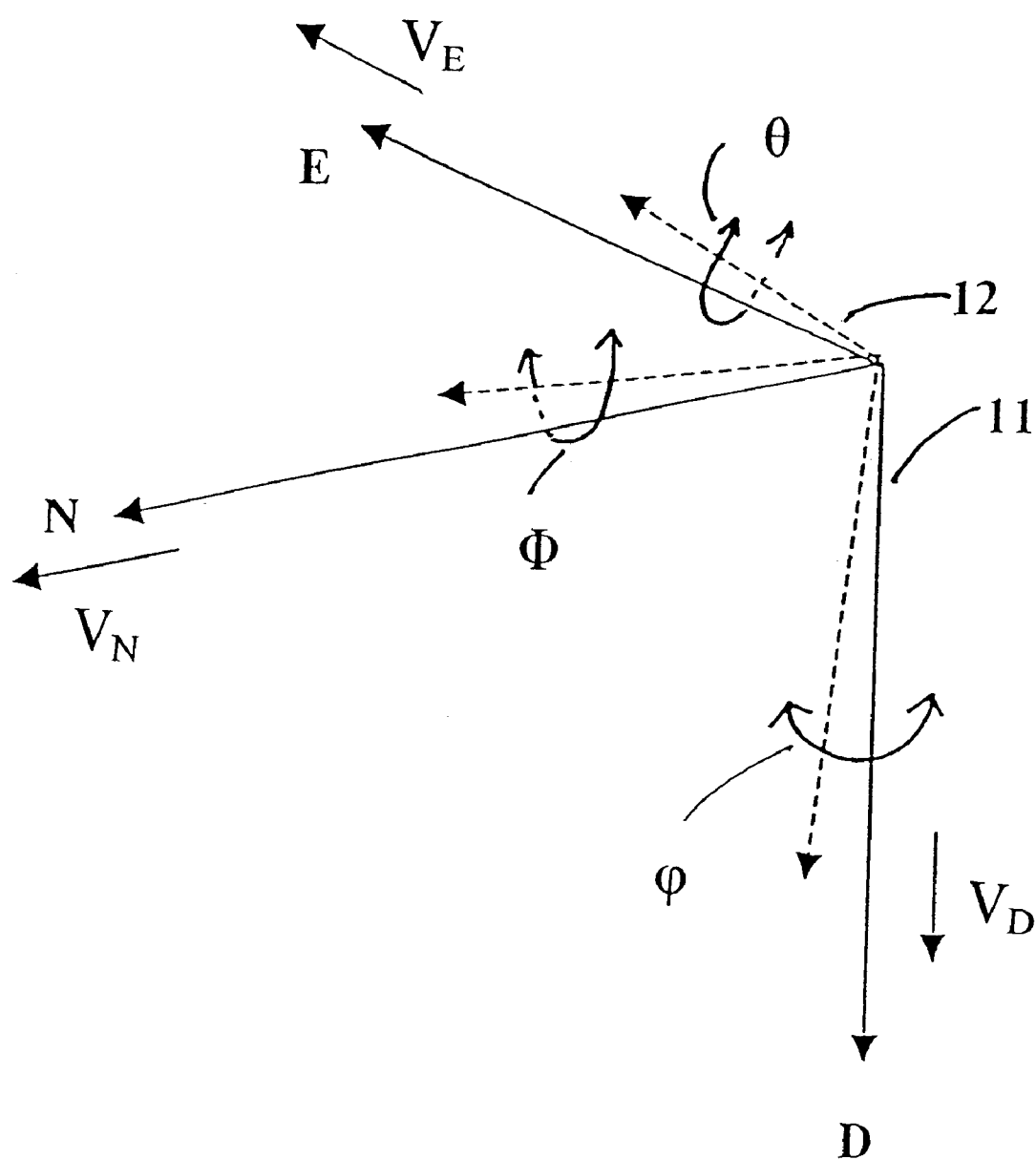
FIG. 1 is a perspective view of the relation between the LLLN navigation coordinates and the coordinate system computed by the carried vehicle's INS, helpful in understanding the invention.

For a detailed description of the invention, reference is now made to FIG. 1. Three sets of coordinates have to be considered: the Global LLLN navigation system 11, the body axes system of the carrier airplane (not shown), and the Cartesian right hand coordinate set 12, which is computed by the INS of the carried vehicle according to its IMU data.

While the INS of the carrier platform handles satisfactorily the difference between the first two coordinate systems, uncertainties arise with respect to the alignment of the first and third coordinate systems. As a result, the computed coordinate set of the carried vehicle is rotated with respect to the LLLN system by a yaw angle $\phi$ about the D axis, with a pitch angle $\theta$ about the E axis, and a roll angle $\phi$ about the N axis.

Consequently, the computed velocity of the carried vehicle in the LLLN navigation system as reported by its INS deviates from the velocity of the carrier vehicle.

Another reason for this deviation, is due to the fact that the velocity as measured by the IMU of the carried vehicle in its own system can be erroneous due to the carried gyro's drifts and accelerometer's biases which have not been corrected yet.

Thus, a measurable velocity error vector in LLLN axes is defined, $\bar{v}(t)$ ($v_N, v_E, v_D$), whose terms are the difference between the measured velocity components supplied by the INS of the carrier vehicle and the corresponding measured velocity components supplied by the INS of the carried vehicle.

$\bar{v}(t)$ which is time dependent, is based at each moment on the measurements of the IMUs in both vehicles adjusted by the value (at the same moment), of a computed state vector $\bar{X}(t)$.

The computed state vector $\bar{X}(t)$ is a time dependent, 12×1 dimensional array, its terms representing the estimated error in the state of the carried vehicle with respect to that of carrier vehicle whose state serves as reference. The first six terms of $\bar{X}(t)$ are: The velocity error group $v$ ($v_N, v_E, v_D$), whose components in the LLLN north pointing coordinate system are shown in FIG. 1, and the attitude error group $\psi$ which is defined with respect to these axes (N,E,D), whose members are the angle $\theta$, which is the rotation about the E axis, the angle $\Phi$, which is the rotation about the N axis, and the angle $\phi$, which is the rotation about the D axis. A distinction should be made between the meaning of $\bar{v}(t)$ as a measured (noisy and fluctuating) vector, and the meaning of $v$ as it appears in the state vector where it represents a predicted filtered estimate of the velocity error. The other components of $\bar{X}(t)$ are; $\epsilon$ (x3), the gyroscopes' drifts, and $\nabla$ (x3), the accelerometers' biases. The system model is that of a linear time variant system for which:

$$\frac{d\bar{X}(t)}{dt} = F(t)\bar{X}(t) + \omega \quad (1)$$

$$\bar{v}(t) = H(t)\bar{X}(t) + \sigma \quad (2)$$

where F(t) is the errors dynamic matrix whose nominal elements represent the propagation of the navigation errors, and $\omega$ is a normal distributed, zero mean, white noise vector which represents the model uncertainty in F(t).

H(t) is the observation matrix: $H(t)=[I_{3\times3}|0_{3\times3}|0_{3\times3}|0_{3\times3}]$, and $\sigma$ is a normal distributed, zero mean, white noise element.

During TA, $\bar{v}(t)$ is fed into the Kalman filter whose output is $\bar{X}(t)$. The obtained $\bar{X}(t)$ is used for the adjustment of the next set of measured $\bar{v}(t)$ values whichin turn yield a new value or $\bar{X}(t)$ and vice versa.

When TA is accomplished for a long enough time, $\bar{v}(t)$ becomes sufficiently small and $\bar{X}(t)$ converges to a constant which provides the pre-launch initial conditions for the INS of the carried vehicle.

It should be evident that a key factors in the TA procedure is the possibility for the correct estimation of the vector $\bar{X}(t)$, and in particular, the correct computational allocation of error among its 12 terms.

In the terminology of the art, such property of the system is referred to as its "observability", and the main point to regard is that: unless it can be analytically proven that the system preserves its observability, the present method is unreliable.

According to the prior art, (see e.g. Baziw I. and Leondes C. T., "In-Flight Alignment and Calibration of IMU", Part I and II, IEEE Transactions on Aerospace and Electronic Systems, Vol. AES-5, July 1972, pp. 439–465), in order to accomplish a complete TA, it is necessary to fly in a trajectory which includes a lateral acceleration.

As noted above, an error is introduced due to measurement delay at this stage. However we were the first to comprehend that the processing and adjustment of the state vector with Kalman filter need not be performed while accelerating. Instead, according to the present invention, during acceleration, $\overline{X}(t)$ is not updated and is allowed to change while the carried vehicle's INS navigates autonomously. This is followed by a relatively large adjustment step of $\overline{X}(t)$ at a later stage where the measurements are no longer sensitive to time delays.

The proof for the observability of the system under the present method is found in appendix A.

Accordingly, the method for TA of the present invention includes the following stages:

1). Define a state vector $\overline{X}(t)$ and a velocity error vector $\overline{v}(t)$, as in prior art, which was described above.

2). Define as in prior art, a dynamic error matrix F(t), and an observation matrix H(t).

$$F(t) = \begin{bmatrix} 0_{3\times3} & A(t) & 0_{3\times3} & C_L^b(t) \\ 0_{3\times3} & 0_{3\times3} & -C_L^b(t) & 0_{3\times3} \\ 0_{3\times3} & 0_{3\times3} & 0_{3\times3} & 0_{3\times3} \\ 0_{3\times3} & 0_{3\times3} & 0_{3\times3} & 0_{3\times3} \end{bmatrix} \quad (3)$$

$$H(t)=[H_v(t) \,|\, 0_{3\times3} \,|\, 0_{3\times3} \,|\, 0_{3\times3}] \quad (4)$$

A(t) is a skew symmetric matrix of specific forces in navigation axes. $C_L^b(t)$ is a transformation matrix from the body axes of the carried vehicle to the navigation axes, and $H_v(t)=[I_{3\times3}]$ or, $H_v(t)=[0_{3\times3}]$.

Figure 2:
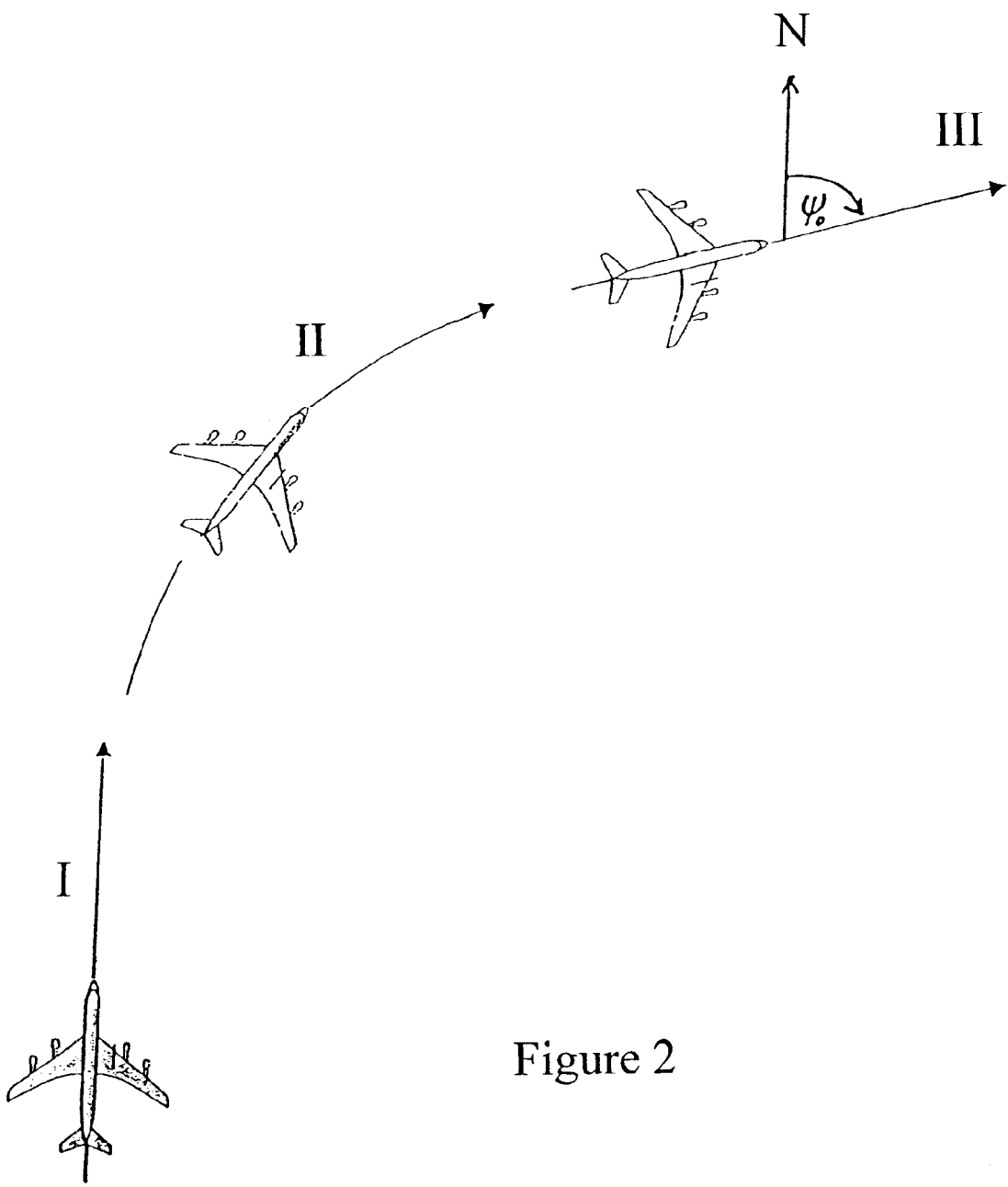
FIG. 2 is a trajectory for flight during TA according to this invention.

3). Define a three segment alignment trajectory, shown in FIG. 2 as follows:

Segment I, which consists of a straight and level flight at constant velocity $V_o$ heading north.

Segment II, which consists of a leveled turn at a constant angular rate $\omega_o$ toward azimuth $\Psi_o$.

Segment III, which consist of a straight and level flight at constant velocity $V_o$ with heading angle $\Psi_o$.

The properties of the dynamic system during the three segments are shown in TABLE 1.

TABLE 1

Properties of the dynamic system during alignment flight

| | I | II | III |
|---|---|---|---|
| $H_v$ | $I_{3\times3}$ | $0_{3\times3}$ | $I_{3\times3}$ |
| $C_L^B$ | $I_{3\times3}$ | $\begin{bmatrix} \cos\Psi(t) & -\sin\Psi(t) & 0 \\ \sin\Psi(t) & \cos\Psi(t) & 0 \\ 0 & 0 & 1 \end{bmatrix}$ | $\begin{bmatrix} \cos\Psi_0 & -\sin\Psi_0 & 0 \\ \sin\Psi_0 & \cos\Psi_0 & 0 \\ 0 & 0 & 1 \end{bmatrix}$ |
| $\vec{A}_{sp}$ | $\begin{Bmatrix} 0 \\ 0 \\ -g \end{Bmatrix}$ | $\begin{Bmatrix} -V_0\omega_0\sin\Psi(t) \\ V_0\omega_0\cos\Psi(t) \\ -g \end{Bmatrix}$ | $\begin{Bmatrix} 0 \\ 0 \\ -g \end{Bmatrix}$ | where $\Psi(t)=\omega_o(t-t_o)$, $\omega_o$ is the angular velocity at segment II, and $t_o$ is the beginning time of the flight in segment II. Instead of the complete skew symmetric matrix A, $$A = \begin{vmatrix} 0 & f_D & f_N \\ -f_D & 0 & -f_E \\ -f_N & f_E & 0 \end{vmatrix}$$

which is a block of 3×3 in F(t), it is shown here, at each flight segment, only the value of the force vector;

$$\vec{A}_{sp} = \begin{pmatrix} f_D \\ f_E \\ f_D \end{pmatrix}$$

that forms matrix A.

4). Apply velocity match Kalman filter transfer alignment to the system, according to the prior art method, with the exception that no updating of $\overline{X}(t)$ is done during the flight in the second segment.

Appendix A

The observability of the system under the method of the invention

The states dynamic model defined in the Kalman Filter, for the in flight transfer alignment is as follows:

$$\frac{d}{dt}\begin{bmatrix} v \\ \psi \\ \varepsilon \\ \nabla \end{bmatrix} = \begin{bmatrix} 0_{3\times3} & A & 0_{3\times3} & C_L^b \\ 0_{3\times3} & 0_{3\times3} & -C_L^b & 0_{3\times3} \\ 0_{3\times3} & 0_{3\times3} & 0_{3\times3} & 0_{3\times3} \\ 0_{3\times3} & 0_{3\times3} & 0_{3\times3} & 0_{3\times3} \end{bmatrix} \cdot \begin{bmatrix} v \\ \psi \\ \varepsilon \\ \nabla \end{bmatrix} \quad (1)$$

With the following definitions:

$v$ Velocity error in Navigation axes (LLLN)

$\Psi$ Attitude error in Navigation axes (LLLN)

$\epsilon$ Gyroscopes' drifts $\nabla$ Accelerometers' bias $C_L^b$ Transformation matrix from body axes to LLLN axes A Skew symmetric matrix of specific forces in LLLN axes The measurement (defined as Z) equation for a velocity matching in flight Transfer alignment is:

$$Z = [I_{3\times3} \; 0_{3\times3} \; 0_{3\times3} \; 0_{3\times3}] \cdot \begin{bmatrix} v \\ \psi \\ \varepsilon \\ \nabla \end{bmatrix} \quad (2)$$

In the paper "The Enigma of False Bias Detection in a Strapdown System During Transfer Alignment" (By I. Y. Bar-Itzhack and Y. Vitek, in the AIAA Journal of Because the synchronization errors affect Transfer alignment only when measurements are taken during maneuvers, the main idea of the patent is to disregard measurements while the aircraft maneuvers.

In order to justify the measurement policy defied above, one has to perform an observability analysis. For that purpose, we'll define the following matrices.

The dynamic matrix, presented in equation (1) will be defined as F(t):

$$F(t) = \begin{bmatrix} 0_{3\times3} & A(t) & 0_{3\times3} & C_L^b(t) \\ 0_{3\times3} & 0_{3\times3} & -C_L^b & 0_{3\times3} \\ 0_{3\times3} & 0_{3\times3} & 0_{3\times3} & 0_{3\times3} \\ 0_{3\times3} & 0_{3\times3} & 0_{3\times3} & 0_{3\times3} \end{bmatrix} \quad (3)$$

and the general measurement matrix will be defined as:

$$H(t)=[H_v(t) \; 0_{3\times3} \; 0_{3\times3} \; 0_{3\times3}] \quad (4)$$

For the state vector $\bar{x}$ defined as:

$$\bar{x} = \begin{bmatrix} v \\ \psi \\ \varepsilon \\ \nabla \end{bmatrix} \in R^{12 \times 1} \quad (5)$$

The dynamic and the measurement defined for the Transfer Alignment Kalman Filter (equations (1) and (2)) are:

$$\dot{\bar{x}} = F(t)\bar{x} \quad (6)$$

$$\vec{Z} = H(t)\bar{x}$$

We'll split the transfer alignment trajectory into 3 analytic segments:

| Segment | Description of Trajectory |
|---|---|
| I | Straight and level flight at a constant velocity $V_0$ heading north |
| II | Leveled turn at a constant angular rate, $\omega_0$ towards azimuth angle $\Psi_0$ |
| III | Straight and level flight at a constant velocity $V_0$ at a heading angle $\Psi_0$ |

At the first segment:

$$H_v = I_{3 \times 3} \quad (7)$$

$$C_L^b = I_{3 \times 3}$$

$$\vec{A}_{sp} = \begin{Bmatrix} 0 \\ 0 \\ -g \end{Bmatrix}$$

$$\Psi = 0$$

At the second segment:

$$H_v = 0_{3 \times 3} \quad (8)$$

$$C_L^b = C_L^b(t)$$

$$\vec{A}_{sp} = \vec{A}_{sp}(t)$$

$$\Psi(t) = \omega_o(t - t_1)$$

and at the third segment:

$$H_v = I_{3 \times 3} \quad (9)$$

$$C_L^b = C_L^b$$

$$\vec{A}_{sp} = \begin{Bmatrix} 0 \\ 0 \\ -g \end{Bmatrix}$$

$$\Psi = \Psi_o$$

Let's define (in the following figure) the three segments timing together with the azimuth and velocity profiles in each segment:

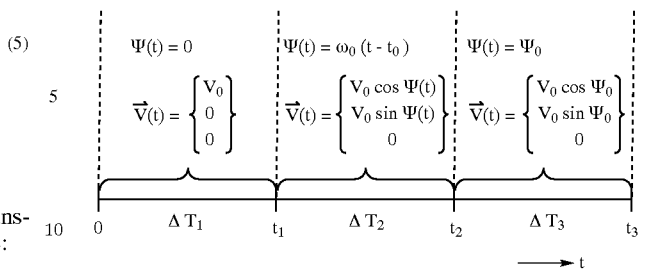

The measurement matrix, H, the transformation matrix, $C_L^b$, and the specific forces matrix $A_{sp}$, in each segment are defined as follows:

| | I | II | III |
|---|---|---|---|
| $H_v$ | $I_{3 \times 3}$ | $0_{3 \times 3}$ | $I_{3 \times 3}$ |
| $C_L^B$ | $I_{3 \times 3}$ | $\begin{bmatrix} \cos\Psi(t) & -\sin\Psi(t) & 0 \\ \sin\Psi(t) & \cos\Psi(t) & 0 \\ 0 & 0 & 1 \end{bmatrix}$ | $\begin{bmatrix} \cos\Psi_0 & -\sin\Psi_0 & 0 \\ \sin\Psi_0 & \cos\Psi_0 & 0 \\ 0 & 0 & 1 \end{bmatrix}$ |
| $\vec{A}_{sp}$ | $\begin{Bmatrix} 0 \\ 0 \\ -g \end{Bmatrix}$ | $\begin{Bmatrix} -V_0\omega_0\sin\Psi(t) \\ V_0\omega_0\cos\Psi(t) \\ -g \end{Bmatrix}$ | $\begin{Bmatrix} 0 \\ 0 \\ -g \end{Bmatrix}$ |

Let's introduce a Lemma:
A system is said to be observable at time T if the Grammian Matrix $$W(T) = \int_0^T \Phi^T(\tau, 0) H^T H \Phi(\tau, 0) d\tau \quad (10)$$

is positive definite.
$\Phi(t_B, t_A)$ is the transition matrix from $t=t_A$ to $t=t_B \cdot \Phi(t_B, t_A)$ is computed through the exponential function based on the dynamic matrix introduced in equation (3)

$$\Phi(t_B, t_A) = e^{F(t)(t_B - t_A)}$$

Let's see if our system is observable? To do so we'll find whether W(T) at $t_3$ is positive definite.
Proof:
The Grammian at $T=t_3$ is:

$$W(t_3) = \int_0^{t_1} \Phi^T(\tau, 0) H^T H \Phi(\tau, 0) dt + \quad (11)$$

$$\int_{t_1}^{t_2} \Phi^t(\tau, 0) H^T H \Phi(\tau, 0) d\tau +$$

$$\int_{t_2}^{t_1} \Phi^t(\tau, 0) H^T H \Phi(\tau, 0) d\tau$$

since there is no measurement at the second segment one will get that:

$$W(t_3) = W_1 + W_3 \quad (12)$$

Another lemma will be introduced: A, B are semi positive definite matrices. C=A+B is positive definite if and only if:
The Null space of A is perpendicular to the Null space of B [Null(A)⊥Null(B)].
Hence, $W(t_3)$ is positive definite if and only if Null($W_1$)⊥Null($W_3$)

Putting the earlier definitions into the Grammian matrix (10) one will get:

$$W_1 = \int_0^{t_1} e^{F_1^T \tau} H^T H e^{F_1 \tau} d\tau \quad (13)$$

$$W_3 = e^{F_1^T t_1} \Phi^T(t_2, t_1) \left[ \int_0^{\Delta T_2} e^{F_3^T \tau} H^T H e^{F_3 \tau} d\tau \right] \Phi(t_2, t_1) e^{F_1 t_1} \quad (14)$$

Because, the dynamic matrix of the system as introduced in equation (3), has the nilpotentic property, so that: ($F_i^k \equiv 0$ k>2)

The observability matrix ($O_1$) in the I-th segment of the dynamic system introduced in equation (6) is:

$$O_i = \begin{bmatrix} H_i \\ H_i F_i \\ H_i F_i^2 \end{bmatrix} \quad (15)$$

Hence, we'll get that:

$$W_1 O_1^T O_1 \quad (16)$$

And that:

$$W_3 e^{F_1 t_1} \Phi^F(t_2, t_1) O_3^T O_3 \Phi(t_2, t_1) e^{F_1 t_1} \quad (17)$$

We'll define:

$$U = \text{Null}(O_1^t O_1) \quad (18)$$

We'll define the following multiplication:

$$R^T R = U^T e^{F_1 t_1} \Phi^T(t_2, t_1) O_3^T O_3 \Phi(t_2, t_1) e^{F_1 t_1} U \quad (19)$$

For the above multiplication to be positive definite, we need the following matrix to be of full rank.

$$R = O_3 \Phi(t_2, t_1) e^{F_1 t_1} U \quad (20)$$

Building the R matrix using the earlier definitions of the other 3 matrices we'll get the conditions for observability of the system (full rank of R).

This will happen when:

$$V_o(2(\cos \Psi_o - 1) + \Psi_o \sin \Psi_o) \; 0$$

$$\omega_o(\cos \Phi_o - 1) \; 0 \quad (21)$$

Hence, In all cases except those very specific occasions contradicting the terms in (21), the system is observable.

So, we are done.

What is claimed is:

1. A method for velocity match transfer alignment between a carrier vehicle and a carried vehicle comprising of:

a) repeatedly measuring a velocity difference between the carrier vehicle and the carried vehicle;

(b) subsequent to each said measurement, updating a state vector that include a predicted value of said velocity difference;

(c) between said measurements, propagating said state vector forward in time; and (d) moving the carrier vehicle and the carried vehicle along a trajectory that includes a first segment, a second segment and a third segment, said moving along said first segment being effected at a first substantially constant velocity, said moving along second segment including an acceleration, said moving along said third segment being effected at a second substantially constant velocity different from said first velocity, said measuring, said updating, and said propagating being effected during said moving along said first and third segments, only said propagating being effected while moving along said second segment.

2. A method according to claim I wherein, said state vector includes estimated attitude difference between the LLLN coordinate set and navigation axes as computed by said carried vehicle.

3. A method according to claim 2 wherein, said state vector includes estimated instrumental offsets of the carried vehicle.

4. A method according to claim 3 wherein, updating said state vector proceeds over time with a Kalman filter whose input is said measured velocity difference.

5. A method according to claim 4 wherein, said moving in said first segment, and in said third segment is leveled.

6. A method according to claim 5 wherein, said moving along said second segment is leveled.

7. A method according to claim 6 wherein, said moving along said first segment is directed northwards.

8. A method according to claim 7 wherein, said moving along said second segment is at constant angular velocity.

9. A method according to claim 8 wherein, said moving along said third segment is in different direction then in said first segment.

* * * * *